United States Patent
Kochheiser

(10) Patent No.: US 8,419,332 B2
(45) Date of Patent: Apr. 16, 2013

(54) NON-DIMPLING FASTENER

(75) Inventor: Michael A. Kochheiser, Bellville, OH (US)

(73) Assignee: Atlas Bolt & Screw Company LLC, Ashland, OH (US)

( * ) Notice: Subject to any disclaimer, the term of this patent is extended or adjusted under 35 U.S.C. 154(b) by 724 days.

(21) Appl. No.: 12/254,573

(22) Filed: Oct. 20, 2008

(65) Prior Publication Data

US 2009/0104001 A1 Apr. 23, 2009

Related U.S. Application Data

(60) Provisional application No. 60/981,351, filed on Oct. 19, 2007.

(51) Int. Cl.
*F16B 35/04* (2006.01)

(52) U.S. Cl.
USPC ............ 411/412; 411/411; 411/424; 411/426

(58) Field of Classification Search ............... 411/387.1, 411/387.6, 388, 389, 424, 426, 411–412
See application file for complete search history.

(56) References Cited

U.S. PATENT DOCUMENTS

| | | | |
|---|---|---|---|
| RE626 E | 11/1859 | Sloan | |
| 113,006 A | 3/1871 | Bidwell | |
| 413,968 A | 10/1889 | Rogers | |
| 438,754 A * | 10/1890 | Rogers | 411/387.1 |
| 1,764,053 A * | 6/1930 | Reed et al. | 470/10 |
| 1,980,093 A | 11/1934 | Rosenberg | |
| 2,266,758 A | 12/1941 | Holtz | |
| 2,382,019 A | 8/1945 | Miller | |
| 3,246,556 A | 4/1966 | Phipard, Jr. | |
| 3,426,820 A | 2/1969 | Phipard, Jr. | |
| 3,478,639 A | 11/1969 | Gruca | |
| 3,524,378 A * | 8/1970 | Wieber | 411/387.3 |
| 3,682,507 A | 8/1972 | Waud | |
| 3,717,067 A | 2/1973 | Vick et al. | |
| 3,788,186 A * | 1/1974 | Crites | 411/8 |
| 3,882,756 A * | 5/1975 | Sauer et al. | 411/387.1 |
| 4,059,102 A | 11/1977 | Devas | |
| 4,534,690 A | 8/1985 | Barth | |
| 4,621,963 A | 11/1986 | Reinwall | |
| 4,778,319 A * | 10/1988 | Schule | 411/387.4 |
| 4,966,024 A | 10/1990 | Hewison | |

(Continued)

FOREIGN PATENT DOCUMENTS

| | | |
|---|---|---|
| DE | 4121751 A1 | 1/1993 |
| EP | 292742 | 11/1988 |
| EP | 314950 | 5/1989 |

*Primary Examiner* — Roberta Delisle
(74) *Attorney, Agent, or Firm* — Jennifer E. Lacroix, Esq.; DLA Piper US LLP

(57) ABSTRACT

Non-dimpling fasteners and methods of installing non-dimpling fasteners are provided herein. Non-dimpling fasteners can include a body including a first end and a second end, a tip at the first end of the body, a head at the second end of the body, a first body portion adjacent to the tip, a second body portion adjacent to the head, and a shoulder adjacent to the first body portion and the second body portion. The first body portion can have a first diameter and can include a first thread. The second body portion can have a second diameter that is larger than the first diameter of the first body portion. The shoulder can have an angle with respect to a longitudinal axis of the fastener.

18 Claims, 3 Drawing Sheets

U.S. PATENT DOCUMENTS

| | | | |
|---|---|---|---|
| 5,019,079 A * | 5/1991 | Ross | 606/312 |
| 5,141,376 A | 8/1992 | Williams et al. | |
| 5,234,301 A * | 8/1993 | Grossberndt et al. | 411/386 |
| 5,252,016 A | 10/1993 | Schmid et al. | |
| 5,259,398 A * | 11/1993 | Vrespa | 128/898 |
| 5,385,439 A | 1/1995 | Hurdle | |
| 5,433,570 A * | 7/1995 | Koppel | 411/392 |
| 5,536,127 A | 7/1996 | Pennig | |
| 5,746,039 A * | 5/1998 | Nystrom | 52/639 |
| 5,795,120 A | 8/1998 | Hurdle | |
| 5,816,012 A * | 10/1998 | Willis | 52/696 |
| 5,863,167 A | 1/1999 | Kaneko | |
| 5,865,584 A * | 2/1999 | Onofrio | 411/411 |
| 5,909,992 A | 6/1999 | Wu | |
| 6,053,653 A | 4/2000 | Tanaka et al. | |
| 6,077,013 A | 6/2000 | Yamamoto et al. | |
| 6,086,303 A | 7/2000 | Flückiger | |
| 6,089,986 A | 7/2000 | Reynolds et al. | |
| 6,176,664 B1 * | 1/2001 | Roberts | 411/387.1 |
| 6,185,896 B1 | 2/2001 | Roberts et al. | |
| 6,685,411 B2 | 2/2004 | Kato | |
| 6,796,761 B2 | 9/2004 | Mizuno et al. | |
| 6,966,737 B2 * | 11/2005 | McGovern et al. | 411/413 |
| 7,189,045 B2 | 3/2007 | McGovern et al. | |
| 7,213,999 B2 | 5/2007 | Haas | |
| 7,367,768 B2 * | 5/2008 | McGovern et al. | 411/412 |
| 7,677,854 B2 * | 3/2010 | Langewiesche | 411/387.2 |
| 2003/0026675 A1 * | 2/2003 | McGovern et al. | 411/412 |
| 2003/0185649 A1 | 10/2003 | Mizuno et al. | |
| 2007/0160440 A1 * | 7/2007 | Langewiesche | 411/386 |
| 2007/0243043 A1 | 10/2007 | Price et al. | |
| 2008/0031705 A1 | 2/2008 | Severns | |

* cited by examiner

NON-DIMPLING FASTENER

RELATED APPLICATIONS

This application claims the benefit of U.S. Provisional Application Ser. No. 60/981,351, entitled "Non-Dimpling Fastener," filed on Oct. 19, 2007, currently pending, which is hereby incorporated by reference in its entirety.

BACKGROUND

The fasteners disclosed herein can be used in construction and, more particularly, for attaching an exterior building panel to a building's structure.

During the construction of a building, exterior panels are typically attached to a building's frame or structure using standard fasteners such as screws, nails, rivets or the like. Such a practice can indent, or "dimple," the exterior at each connection point.

Dimpling of a wall panel at a fastener location can occur due to compression of the insulation that holds the exterior panel off of the frame elements, which are commonly referred to as girts. The amount of dimpling tends to increase with the thickness of the insulation.

BRIEF SUMMARY

Generally, fasteners disclosed herein can be used to attach any two items that require a predetermined stopping point along the length of the fastener. For example, the fasteners can be used to attach a metal external panel and a layer of insulation, to the metal frame member of a building. Preferably, use of the fasteners disclosed herein can reduce or eliminate the dimpling effect that is commonly observed when standard fasteners are used to attach exterior panels to a building's frame or structure. The fasteners described herein can thus be referred to as being non-dimpling fasteners.

In one aspect, a non-dimpling fastener is provided that includes a body including a first end and a second end, a tip at the first end of the body, a head at the second end of the body, a first body portion adjacent to the tip, a second body portion adjacent to the head, and a shoulder adjacent to the first body portion and the second body portion. The fastener also includes at least a first thread. The first thread can be a continuous thread that extends from at least the first body portion to the second body portion, including the shoulder. The first body portion has a first diameter. The second body portion has a second diameter that is larger than the first diameter of the first body portion. The shoulder can have an angle with respect to a longitudinal axis of the fastener.

In a second aspect, a non-dimpling fastener is provided that includes a body including a first end and a second end, a tip at the first end of the body, a head at the second end of the body, a first body portion adjacent to the tip, a second body portion adjacent to the head, a shoulder adjacent to the first body portion and the second body portion, and a first thread extends continuously from the first body portion to the second body portion, including the shoulder. The first body portion has a first diameter. The second body portion has a second diameter that is larger than the first diameter of the first body portion. The shoulder can have an angle with respect to a longitudinal axis of the fastener.

In another aspect, a method of attaching a metal exterior building panel to a metal frame element using a non-dimpling fastener is provided that includes providing a metal exterior building panel, providing a metal frame member, providing a fastener, and inserting the fastener through the metal exterior building panel and the metal frame element. The fastener can include a body having a first end and a second end, a tip at the first end of the body, a head at the second end of the body, a first body portion adjacent to the tip, a second body portion adjacent to the head, and a shoulder adjacent to the first body portion and the second body portion. The first body portion has a first diameter and can include a first thread. The second body portion has a second diameter that is larger than the first diameter of the first body portion. The shoulder can have an angle with respect to a longitudinal axis of the fastener. In such a method, the fastener stops when the shoulder encounters the frame elements, the second body portion of the fastener being positioned through the exterior panel, and the first body portion of the fastener being positioned within the frame.

BRIEF DESCRIPTION OF SEVERAL VIEWS OF THE DRAWINGS

Specific embodiments of the invention have been chosen for purposes of illustration and description, and are shown in the accompanying drawings, forming a part of the specification.

DETAILED DESCRIPTION

While the fastener embodiments illustrated herein are described below in terms of use in constructing metal buildings, it should be understood that the fasteners could be used to attach building exterior panels to building frames where the exterior panels and frames are constructed of materials other than steel. Such materials include, but are not limited to wood, plastic, concrete and composite materials.

Figure 1:
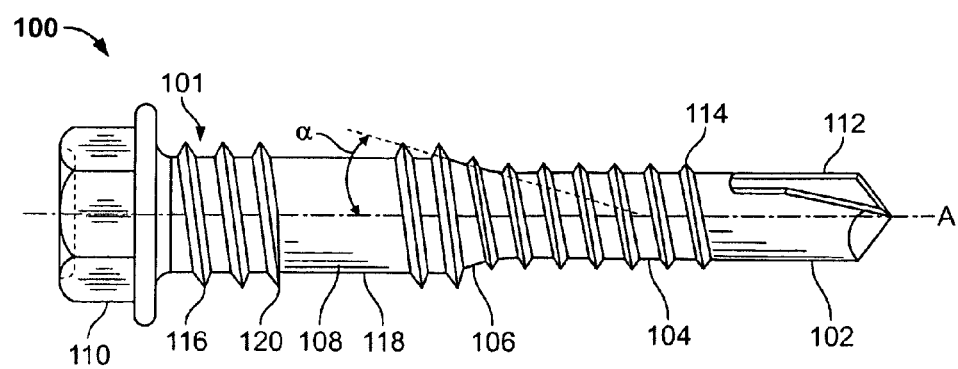
FIG. 1 illustrates a first embodiment of a non-dimpling fastener.

FIG. 1 shows a first example of a non-dimpling fastener indicated generally at 100. Fastener 100 has a body 101 that extends along longitudinal axis A from tip 102 at the first end of the fastener 100 to head 110 at the second end of the fastener. Fastener 100 also includes first body portion 104, shoulder 106, and second body portion 108. Tip 102 as illustrated includes a self-drilling point 112. In an alternative example, the tip 102 could include a self-tapping point. The first body portion 104 is adjacent to the tip 102, and has a circular cross section having a first diameter. The second body portion 108 is adjacent to the head 110 of the fastener 100, and has a circular cross section having a second diameter that is larger than the first diameter of the first body portion 104.

Shoulder 106 is the location at which the fastener transitions from the first body portion 104 to the second body portion 108. Thus, shoulder 106 is located between and adjacent to first body portion 104 and second body portion 108. Shoulder 106 can be a circumferential wedge. Shoulder 106 can be tapered or sloped, and can form an angle $\alpha$ with the longitudinal axis A of the fastener 100. Angle $\alpha$ can be about 40°, or can be greater than about 40°, and can be up to about 90°. For example, shoulder 106 can form an angle $\alpha$ of about 45°, about 50°, about 55°, about 60°, about 65°, about 70°, about 75°, about 80°, about 85°, or about 90°. In some examples, the taper or slope of shoulder 106 can be straight or curved, and can thus be constant or can change over the length of the shoulder 106.

As shown in FIG. 1, the fastener 100 is threaded. In the illustrated example, the fastener 100 has two threaded sections. In the first threaded section, continuous first thread 114 starts at a point (not shown) on the first body portion 104, extends along the shoulder 106, and ends at an intermediate point (not shown) on the second body portion 108. The second threaded section has second thread 116 that starts at a first point 120 on the second body portion 108 and ends at a second point (not shown) on the second body portion 108 that is at or near the head 110 of the fastener 100. The first threaded section and the second threaded section have an unthreaded section 118 between them on the second body portion 108 of the fastener 100. Unthreaded section 108 can have any desired width, and preferably has a width that is equal to from about two turns of the first thread 114 to about four turns of the first thread 114.

Figure 2:
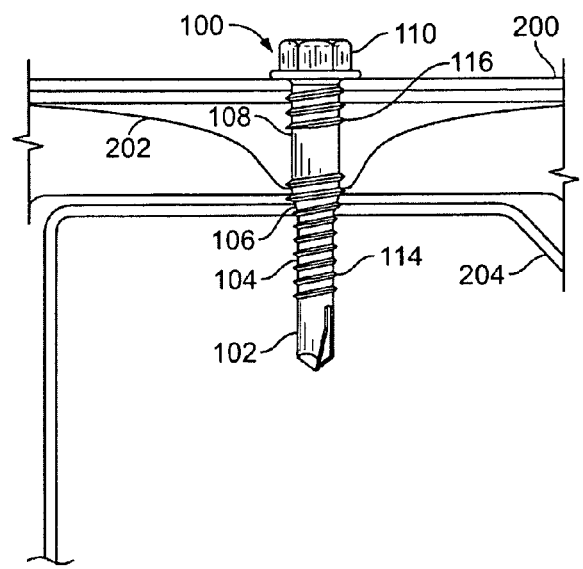
FIG. 2 illustrates a non-dimpling fastener of FIG. 1 as installed.

Referring to FIG. 2, during installation, the tip 102 and first body portion 104 of the fastener 100 can travel through an exterior panel 200 and insulation 202 to enter into the frame element 204. Exterior panel 200 can be any suitable panel, including, but not limited to, an exterior panel for a metal building that is constructed of 26 gauge steel, or steel of any other suitable gauge. Insulation 202 can be batt insulation, and can have any desired thickness and insulation R value. For example, insulation 202 can have an insulation value from about R-13 to about R-26, and can be from about 4 inches thick to about 6 inches thick, or to about 8 inches thick. Insulation 202 can be a single layer of insulation, a double layer of insulation, or can be multiple layers of insulation. Frame element 204 can constructed of be any suitable material including, but not limited to, 12 gauge to 16 gauge steel.

As fastener 100 travels through the exterior panel 200 and the insulation 202, the insulation 202 can become compressed as shown in FIG. 2. When the shoulder 106 encounters the frame element 204, in addition to the compressed insulation 202, the shoulder 106 prevents the second body portion 108 from entering the frame element 204. Thus, the shoulder 106 causes the fastener 100 to stop at a designated point, and reduces or prevents dimpling of the external panel 200. The second body portion 108 of the fastener 100 is positioned through the exterior panel 200 and the insulation 202, while the first body portion 104 of the fastener 100 is positioned within the frame. Additionally, the second thread 116 thread near the head 110 of the fastener 100 can hold the exterior panel 200 in place against the head 110 of the fastener 100 once it is installed. As a result, the building's exterior panel 200 can be attached to the building's structure without creating a dimpling appearance in the exterior panel 200.

Figure 3:
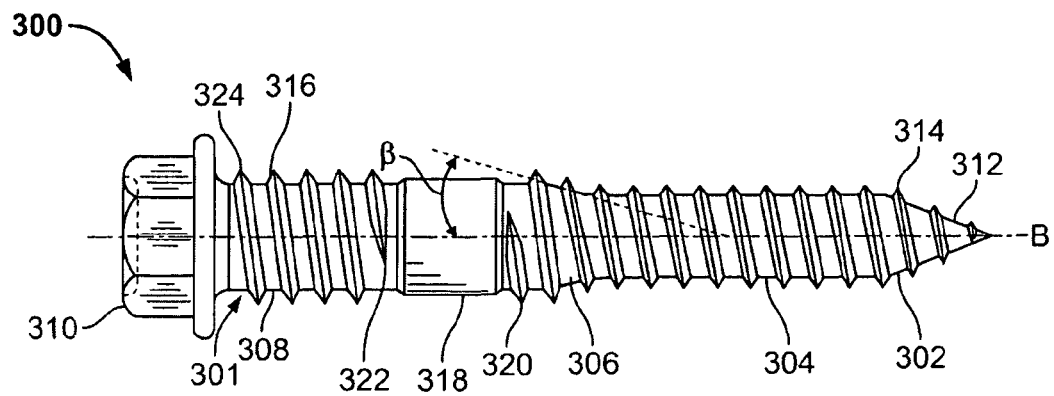
FIG. 3 illustrates a second embodiment of a non-dimpling fastener.

FIG. 3 shows a second example of a non-dimpling fastener indicated generally at 300. Fastener 300 can be installed in the same manner as fastener 100.

Fastener 300 has a body 301 that extends along longitudinal axis B from tip 302 at the first end of the fastener 300 to head 310 at the second end of the fastener 300. Fastener 300 also includes first body portion 304, shoulder 306, and second body portion 308. Tip 302 as illustrated includes a self-tapping point 312. In an alternative example, tip 302 could include a self-drilling point. The first body portion 304 is adjacent to the tip 302, and has a circular cross section having a first diameter. The second body portion 308 is adjacent to the head 310 of the fastener 300, and has a circular cross section having a second diameter that is larger than the first diameter of the first body portion 304. Shoulder 306 is the location at which the fastener transitions from the first body portion 304 to the second body portion 308. Thus, shoulder 306 is located between and adjacent to first body portion 304 and second body portion 308. Shoulder 306 can be a circumferential wedge. Shoulder 306 can be tapered or sloped, and can form an angle $\beta$ with the longitudinal axis B of the fastener 100. Angle $\beta$ can be about 40°, or can be greater than about 40°, and can be up to about 90°. For example, shoulder 306 can form an angle $\beta$ of about 45°, about 50°, about 55°, about 60°, about 65°, about 70°, about 75°, about 80°, about 85°, or about 90°. In some examples, the taper or slope of shoulder 306 can be straight or curved, and can thus be constant or can change over the length of the shoulder 306.

As shown in FIG. 3, the fastener 300 is threaded. In the illustrated example, the fastener 300 has two threaded sections. In the first threaded section, continuous first thread 314 starts at the self-tapping point 312 of tip 302, extends along the first body portion 304 and the shoulder 306, and ends at an intermediate point 320 on the second body portion 308. The second threaded section has second thread 316 that starts at a first point 322 on the second body portion 308 and ends at a second point 324 on the second body portion 308 that is at or near the head 310 of the fastener 300. The first threaded section and the second threaded section have an unthreaded section 318 between them on the second body portion 308 of the fastener 300. Unthreaded section 308 can have any desired width, and preferably has a width that is equal to from about two turns of the first thread 314 to about four turns of the first thread 314.

Figure 4:
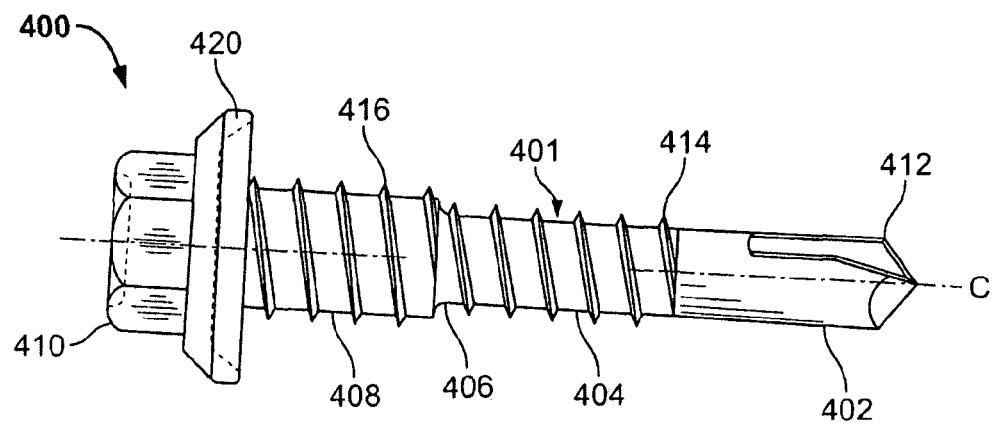
FIG. 4 illustrates a third embodiment of a non-dimpling fastener.

FIG. 4 shows a third example of a non-dimpling fastener indicated generally at 400. Fastener 400 can be installed in the same manner as fastener 100. Fastener 400 has a body 401 that extends along longitudinal axis C from tip 402 at the first end of the fastener 400 to head 410 at the second end of the fastener 400. Fastener 400 also includes first body portion 404, shoulder 406, and second body portion 408. Tip 402 as illustrated includes a self-drilling point 412. In an alternative example, the tip 402 could include a self-tapping point. The first body portion 404 is adjacent to the tip 402, and has a circular cross section having a first diameter. The second body portion 408 is adjacent to the head 410 of the fastener 400, and has a circular cross section having a second diameter that is larger than the first diameter of the first body portion 404. Head 410 includes a washer 420 that is integrally formed with the head 410. Washer 420 is an undercut washer. Shoulder 406 forms an angle $\gamma$ with the longitudinal axis C of the fastener 400. As illustrated, shoulder 406 is a squared-off shoulder, having an angle $\gamma$ of about 90° at the transition point from the first body portion 404 to the second body portion 408. In alternative examples, shoulder 406 could have any other suitable angle $\gamma$, including the angles discussed above with respect to angles $\alpha$ and $\beta$.

As shown in FIG. 4, the fastener 400 is threaded. In the illustrated example, the fastener 400 has two threaded sections. In the first threaded section, first thread 414 is located on the first body portion 404. The second threaded section has second thread 116 that is located on the second body portion 408 of the fastener 400. The first thread 414 and the second thread 416 are separate threads, and each terminates at or near shoulder 406.

Figure 5:
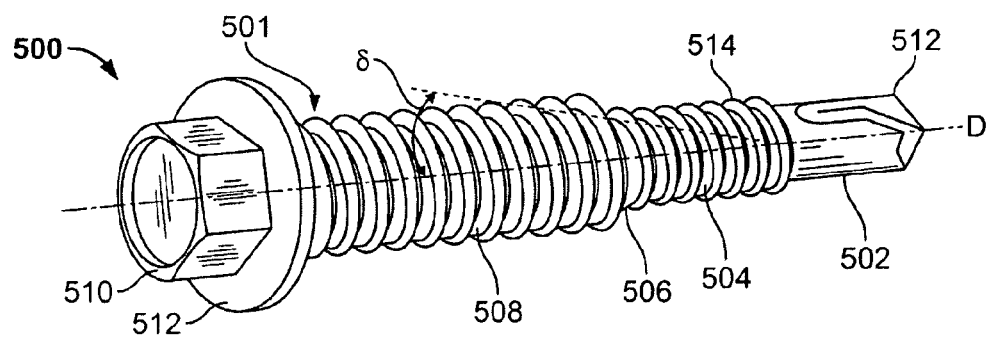
FIG. 5 illustrates a fourth embodiment of a non-dimpling fastener.

FIG. 5 shows a fourth example of a non-dimpling fastener indicated generally at 500. Fastener 500 has a body 501 that extends along longitudinal axis D from tip 502 at the first end of the fastener 500 to head 510 at the second end of the fastener 500. Fastener 500 also includes first body portion 504, shoulder 506, and second body portion 508. Tip 502 as illustrated includes a self-drilling point 512. Head 510 includes a washer 512. Washer 512 is integrally formed with head 510.

As illustrated in FIG. 5, the first body portion 504 is adjacent to the tip 502, and has a circular cross section having a first diameter. The second body portion 508 is adjacent to the head 510 of the fastener 500, and has a circular cross section having a second diameter that is larger than the first diameter of the first body portion 504. Shoulder 506 is the location at which the fastener transitions from the first body portion 504 to the second body portion 508. Thus, shoulder 506 is located between and adjacent to first body portion 504 and second body portion 508. Shoulder 506 can be a circumferential wedge. Shoulder 506 can be tapered or sloped, and can form an angle δ with the longitudinal axis D of the fastener 500. Angle δ can be about 40°, or can be greater than about 40°, and can be up to about 90°. For example, shoulder 506 can form an angle δ of about 45°, about 50°, about 55°, about 60°, about 65°, about 70°, about 75°, about 80°, about 85°, or about 90°. In some examples, the taper or slope of shoulder 506 can be straight or curved, and can thus be constant or can change over the length of the shoulder 506.

Fastener 500 has a continuous thread 514 that extends from the first body portion 504 of the fastener 500 to a point of the second body portion 508 at or near the head 510 of the fastener 500, including shoulder 506. In an alternative example where the tip 502 is a self-tapping point, the thread 514 could extend from the tip 502 to a point of the second body portion 508 at or near the head 510 of the fastener 500, including shoulder 506. The thread 514 transitions in diameter in conjunction with the transition in diameter of the body 501 of the fastener 500.

Figure 6:
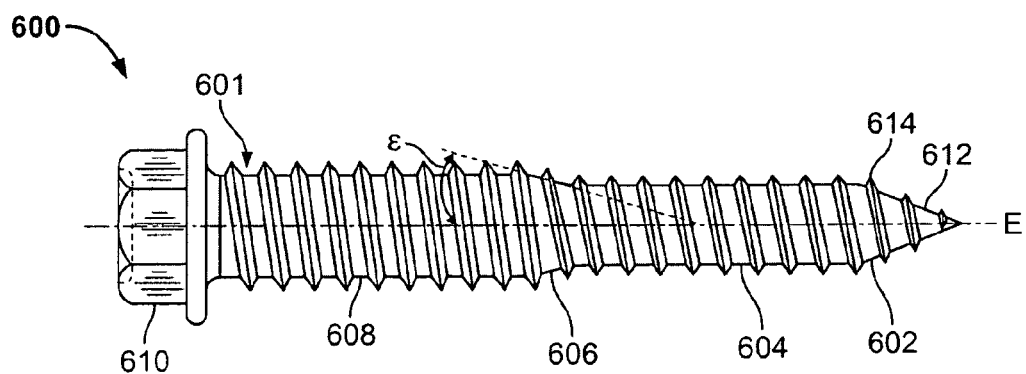
FIG. 6 illustrates a fifth embodiment of a non-dimpling fastener.

FIG. 6 shows a fifth example of a non-dimpling fastener indicated generally at 600. Fastener 600 has a body 601 that extends along longitudinal axis E from tip 602 at the first end of the fastener 600 to head 610 at the second end of the fastener 600. Fastener 600 also includes first body portion 604, shoulder 606, and second body portion 608. Tip 602 as illustrated includes a self-tapping point 612.

As illustrated in FIG. 6, the first body portion 604 is adjacent to the tip 602, and has a circular cross section having a first diameter. The second body portion 608 is adjacent to the head 610 of the fastener 600, and has a circular cross section having a second diameter that is larger than the first diameter of the first body portion 604. Shoulder 606 is the location at which the fastener transitions from the first body portion 604 to the second body portion 608. Thus, shoulder 606 is located between and adjacent to first body portion 604 and second body portion 608. Shoulder 606 can be a circumferential wedge. Shoulder 606 can be tapered or sloped, and can form an angle ε with the longitudinal axis E of the fastener 600. Angle ε can be about 40°, or can be greater than about 40°, and can be up to about 90°. For example, shoulder 606 can form an angle ε of about 45°, about 50°, about 55°, about 60°, about 65°, about 70°, about 75°, about 80°, about 85°, or about 90°. In some examples the taper or slope of shoulder 606 can be straight or curved, and can thus be constant or can change over the length of the shoulder 606.

Fastener 600 has a continuous thread 614 that extends from the tip 602 to a point of the second body portion 608 at or near the head 610 of the fastener 600, including shoulder 606. The thread 614 transitions in diameter in conjunction with the transition in diameter of the body 601 of the fastener 600.

In alternative examples, a non dimpling fastener can have any of the features of the examples illustrated in FIGS. 1 through 5. The tip of a non-dimpling fastener can be any suitable tip, including, but not limited to a self-drilling point or a self-tapping point. The head of a non-dimpling fastener can have a washer integrally formed with the head, or can not include such a washer. A washer can be included as a component of a fastener can be integrally formed with the head, and can be flat, undercut, or have an alternative structure. The shoulder of a non-dimpling fastener can be sloped or squared-off, and preferably has an angle that facilitates the desired function of stopping the fasteners installation at the shoulder to prevent dimpling of an exterior panel. A non-dimpling fastener can have a single continuous thread that extends from the first body portion to any point on the second body portion, including to the head of the fastener, or can have multiple separate threads. Additionally, non-dimpling fasteners can be constructed from steel, aluminum, plastic or any other suitable material. Further, non-dimpling fasteners can have any desired length. For example, a non-dimpling fastener can have a length from about 1 inch to about 3 inches, or from about 1 inch to about 2 inches, including, but not limited to 1¼ inches, 1 3/16 inches, 1½ inches, and 1¾ inches.

EXAMPLE 1

Standard wall fasteners and fasteners in accordance with the example of FIG. 1 were used in constructing a building mock-up using L3P steel panels and six inch R-19 insulation. Definite dimpling effects resulted from use of the standard wall fasteners, while dimpling effects did not occur with use of the fasteners if FIG. 1.

EXAMPLE 2

Fasteners in accordance with the example of FIG. 1 were used in constructing a building at a test site using L3P steel panels and double layers of 4 inch R-13 insulation. The fasteners performed well, and dimpling effects were not observed on the walls of the finished building.

EXAMPLE 3

Fasteners in accordance with the example of FIG. 1 were used in constructing a building at a test site using A3P steel panels and 6 inch R-19 insulation. Dimpling effects were not observed at the intermediate girts. Standard fasteners were used at the base angle and eave strut locations. When the inventive fasteners were used at the base angle and eave strut locations, it was found that the fasteners failed to pull the wall sheet out to the head of the fasteners. The use of excessive force at these locations resulted in the fasteners continuing to tap until the larger diameter threads were fully engaged into the light gage secondary. It is believed that these results at the base angle and eave strut locations were due to the smaller bearing area of the A3P panel ribs and the increased compression at the ends of the insulation.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. A non-dimpling fastener comprising:
    a body including a first end and a second end,
    a tip at the first end of the body, a head at the second end of the body, a first body portion adjacent to the tip, the first body portion having a circular cross section with a first diameter, a second body portion adjacent to the head, the second body portion having a circular cross section with a second diameter that is larger than the first diameter of the first body portion, a shoulder adjacent to the first body portion and the second body portion, the shoulder having an angle with respect to a longitudinal axis of the fastener and being configured as a predetermined stopping point along the length of the fastener that causes the fastener to stop during installation when the shoulder encounters a frame element in order to prevent dimpling of an exterior panel; and a first thread that is a continuous thread extending from at least the first body portion, along the shoulder, to an intermediate point on the second body portion.

2. The non-dimpling fastener of claim 1, wherein the second body portion includes a second thread that is separate from the first thread of the first body portion.

3. The non-dimpling fastener of claim 2, wherein the second body portion includes a second thread near the head of the fastener and an unthreaded section between the first thread and the second thread.

4. The non-dimpling fastener of claim 3, wherein the unthreaded section has as width that is equal to from about two turns of the first thread to about four turns of the first thread.

5. The non-dimpling fastener of claim 1, wherein the shoulder is tapered.

6. The non-dimpling fastener of claim 1, wherein the angle of the shoulder is from about 40° to about 90°.

7. The non-dimpling fastener of claim 6, wherein the angle of the shoulder is about 40°.

8. The non-dimpling, fastener of claim 7, wherein the angle of the shoulder is about 90°.

9. The non-dimpling fastener of claim 1, wherein the tip includes a self-drilling point or a self-tapping point.

10. The non-dimpling fastener of claim 1, wherein the head includes a washer integrally formed with the head.

11. The non-dimpling fastener of claim 10, wherein the washer is an undercut washer.

12. The non-dimpling fastener of claim 1, wherein the fastener is constructed from steel, aluminum, or plastic.

13. The non-dimpling fastener of claim 1, wherein the fastener has as length from about 1 inch to about 3 inches.

14. A non-dimpling fastener comprising:

a body including a first end and a second end, a tip at the first end of the body, a head at the second end of the body, a first body portion adjacent to the tip, the first body portion having a circular cross section with a first diameter, a second body portion adjacent to the head, the second body portion having a circular cross section with a second diameter that is larger than the first diameter of the first body portion, a shoulder adjacent to the first body portion and the second body portion, the shoulder having an angle with respect to a longitudinal axis of the fastener and being configured as a predetermined stopping point along the length of the fastener that causes the fastener to step during installation when the shoulder encounters a frame element in order to prevent dimpling of an exterior panel, and a first thread that is a continuous thread that extends from at least the first body portion, along the shoulder, to an intermediate point on the second body portion, wherein the second body portion includes a second thread near the head of the fastener and an unthreaded section on the second body portion between the first thread and the second thread.

15. The non-dimpling fastener of claim 14, wherein the angle of the shoulder is from about 40° to about 90°.

16. The non-dimpling fastener of claim 14, wherein the tip includes a self-drilling point or a self-tapping point.

17. A method of attaching a metal exterior building panel to a metal frame element using a non-dimpling fastener, the method including the steps of:

providing a metal exterior building panel;

providing a metal frame member;

providing a fastener, the fastener including:

a body including a first end and a second end, a tip at the first end of the body, a head at the second end of the body, a first body portion adjacent to the tip, the first body portion having a circular cross section with a first diameter, a second body portion adjacent to the head, the second body portion having circular cross section with a second diameter that is larger than the first diameter of the first body portion, a shoulder adjacent to the first body portion and the second body portion, the shoulder having an angle with respect to a longitudinal axis of the fastener and being configured as a predetermined stopping point along the length of the fastener that causes the fastener to stop during installation when the shoulder encounters a frame element in order to prevent dimpling of an exterior panel; and a first thread that is a continuous thread extending from at least the first body portion, along the shoulder, to an intermediate point on the second body portion; and inserting the fastener through the metal exterior building panel and the metal frame element wherein the shoulder having the first thread causes the fastener to stop when the shoulder encounters the frame element, the second body portion of the fastener is positioned through the exterior panel, and the first body portion of the fastener is positioned within the frame.

18. The method of claim 17, wherein the wherein the angle of the shoulder is from about 40° to about 90°.

* * * * *